(12) United States Patent
Evemy et al.

(10) Patent No.: US 7,489,384 B2
(45) Date of Patent: Feb. 10, 2009

(54) IMAGE DISPLAY SYSTEM

(75) Inventors: Jeffrey Dennis Evemy, Lyme Regis (GB); Richard White, Dorchester (GB)

(73) Assignee: In-Tunnel Ltd. (GB)

( * ) Notice: Subject to any disclaimer, the term of this patent is extended or adjusted under 35 U.S.C. 154(b) by 469 days.

(21) Appl. No.: 10/540,287

(22) PCT Filed: Dec. 18, 2003

(86) PCT No.: PCT/GB03/05549

§ 371 (c)(1),
(2), (4) Date: Jun. 20, 2005

(87) PCT Pub. No.: WO2004/055767

PCT Pub. Date: Jul. 1, 2004

(65) Prior Publication Data

US 2006/0087498 A1    Apr. 27, 2006

(30) Foreign Application Priority Data

Dec. 18, 2002  (GB) ................................ 0229432.0

(51) Int. Cl.
*G03B 25/00*   (2006.01)
*G09F 19/14*   (2006.01)
(52) U.S. Cl. ........................................ 352/100; 40/453
(58) Field of Classification Search ................ 352/100, 352/40, 98; 40/453, 463
See application file for complete search history.

(56) References Cited

U.S. PATENT DOCUMENTS

| | | | | |
|---|---|---|---|---|
| 5,650,794 A | * | 7/1997 | Walsh | 345/56 |
| 6,353,468 B1 | * | 3/2002 | Howard et al. | 352/100 |
| 6,466,182 B1 | * | 10/2002 | Shigetomi et al. | 345/1.1 |
| 6,466,183 B1 | * | 10/2002 | Yamamoto et al. | 345/1.1 |
| 6,564,486 B1 | * | 5/2003 | Spodek et al. | 40/453 |
| 6,870,596 B2 | * | 3/2005 | Walker et al. | 352/100 |

FOREIGN PATENT DOCUMENTS

| | | |
|---|---|---|
| DE | 31 05 820 A1 | 2/1981 |
| EP | 0 930 602 A1 | 1/1999 |
| EP | 0 989 535 A2 | 9/1999 |
| JP | 01022103 | 1/1989 |
| WO | 02/21488 A2 | 3/2002 |

* cited by examiner

*Primary Examiner*—Rodney E Fuller
(74) *Attorney, Agent, or Firm*—Gifford, Krass, Sprinkle, Anderson & Citkowski, P.C.

(57) ABSTRACT

An image display system of the type which may be used to present video images to occupants of a vehicle (10), such as a subway train, by briefly illuminating individual images provided on display boards (14) in a tunnel or the like, in sequence, so that occupants of the vehicle (10) observe a motion picture. One aspect of the invention provides a control unit for an image display system including a series of images (16) positioned along the path of a vehicle and lighting for briefly illuminating individual images and a detector (20) arranged to output repeated measurements of the speed of a passing vehicle. The control unit comprises a processing means including a first system arranged to process the repeated speed measurements to produce an instantaneous estimate of the position of the vehicle along the vehicle path, and a second system arranged to derive the illumination timings from the instantaneous estimate of the position of the vehicle.

15 Claims, 15 Drawing Sheets

IMAGE DISPLAY SYSTEM

The present invention relates to an apparatus and method for displaying images. In particular, the present invention relates to a digital display system and method for displaying images to the passengers in a vehicle such as a train or the like.

It is well known to present video images to occupants of a vehicle, such as a subway train and the like, the images being provided on display boards arranged at prescribed intervals along the wall of a tunnel or similar, each display board being lit in sequence such that an occupant of the vehicle looking out of the window of the vehicle will see each display board being lit to display an image in time with the rate at which the vehicle and therefore the occupant passes each display board. The occupant thereby experiencing the visual effect of viewing a moving picture whilst looking out of the window of the vehicle.

One of the drawbacks associated with known arrangements is that it is difficult to generate sufficiently accurate illumination timings for illuminating the individual images such that the image positions relative to the vehicle are stable. In practice the illumination timing signals (pulses) should be accurate to within 50 microseconds, or less, if perceptible levels of drift and jitter are to be avoided. Drift occurs when the cinematographic image viewed by the passenger drifts away from its initial position, while jitter is perceived as a random movement backwards and forwards of successive images. In order to avoid jitter subsequent frames of each image must be positioned within 1 mm or less of each other. This degree of positional accuracy of the images relative to the vehicle corresponds to a timing accuracy of 50 microseconds or less for the display pulses for illuminating individual images at a vehicle speed of 20 meters per second.

In a number of prior proposals, for example in the system described in WO00/55835, the images are illuminated successively at illumination timings based on repeated speed measurements of the vehicle and are proportional to the instantaneous speed of the vehicle and the image spacing. The accuracy of such a system is dependent of the frequency that the speed of the vehicle is repeatedly measured in order to update the illumination timings. In such a system if the illumination timings are based on the wrong speed or the measured speed is not updated as often as is necessary the illumination timings can result in drift and jitter of the illuminated image.

There is a requirement to generate illumination timing signals in real time for all images in the sequence of images for all window positions in which the sequence of images are to be presented.

There is a further requirement to generate illumination timing signals in real time knowing the initial position of the vehicle along the path of the vehicle, the position of the individual images to be displayed and the relative position of the windows on the vehicle where the image sequence is to be displayed.

According to an aspect of the present invention there is provided an image display system comprising:
 display means for displaying a series of images along the path of a vehicle;
 lighting for briefly illuminating individual images;
 at least one detector to output repeated measurements of the speed of a passing vehicle; and,
 control means arranged to control the lighting to illuminate images successively as the vehicle passes at illumination timings based on the position of the vehicle along the said path;
 wherein the control means comprises processing means including a first system arranged to process the repeated speed measurements to produce an instantaneous estimate of the position of the vehicle along the said path, and a second system arranged to derive the illumination timings from the instantaneous estimate of the position of the vehicle.

This aspect of the invention regularly enables the instantaneous position of the vehicle along the path to be estimated, in real time, from updated measurements of the speed of the vehicle at a rate greater than the repeated measurements of the speed of the vehicle. For example, the estimated position of the vehicle along the path it is travelling maybe updated once ever 16 microseconds, that is to say at a clock rate of 62.5 kHz while the speed of the vehicle may be measured 10 times per second, that is to say at a frequency of 10 Hertz. This aspect of the invention is based on the principle that accurate illumination timings may be generated, in real time, by accurately estimating the position of the vehicle in relation to a known starting position, or initial detection position, using updated measurements of the speed of the vehicle. This can be readily achieved in embodiments where the first system is arranged to implement first, second, third or higher order polynomial solutions for the equation of motion s=f(t). This readily enables the instantaneous position of the vehicle to be accurately estimated using not only updated speed measurements of the vehicle but also updated acceleration measurements and higher order terms if necessary.

Preferably, the first system comprises a plurality of cascaded registers, including a first register arranged to be loaded with instantaneous values derived from the said repeated speed measurements and a second register arranged to be loaded with values representing the instantaneous position of the vehicle. Preferably, the first and second registers may be loaded and read by means such as a microprocessor and the registers may be of arbitory resolution the first and second registers are initially loaded with initial values representing the speed and position of the vehicle. The first register may be subsequently loaded with updated values representing the speed of the vehicle as determined by the detector. At all times the second register is loaded with an instantaneous value representing the estimated position of the vehicle at any one instance in time, that is to say during any single clock cycle.

The first system may further comprise a means for adding the instantaneous values of the first and second registers for repeatedly updating the second register, and a third register arranged to implement a time delay function on the output from the adding means before the second register is updated. In this way it is possible to periodically update the second register during each clock cycle as determined by the time delay of the third register. Conveniently, the third register implements a time delay, without attenuation, represented by the transfer function $G(s)=e^{-sT}$, where T is the delay time.

The time delay function of the third register may be determined such that the second register is periodically updated at least once every 50 microseconds, that is to say the clock speed of the third register is 20 kHz or more. In a preferred embodiment the third register implements a time delay of 16 microseconds (62.5 kHz).

The instantaneous values of the first register represent the distance travelled by the vehicle in the instant cycle.

In preferred embodiments, the instantaneous values of the first register are scaled values of the measure of velocity of the vehicle. The most recent measurement of the speed of the vehicle may be scaled by the time interval, or delay, implemented by the third register. For example, if the most recent measurement of speed of the vehicle is 20 meters per second and the time delay implemented by the third register is 16 microseconds the scaled value of the first register would be 0.32 mm.

In preferred embodiments the first system further comprises a fourth register arranged with values representing the instantaneous acceleration of the vehicle. In this way it is possible to take into account the measured acceleration of the vehicle as well as the updated speed of the vehicle.

The means for adding may comprise a first means for adding and the first system may further comprise a second means for adding the instantaneous values of the first and fourth registers for repeatedly updating the first register, and a fifth register arranged to implement a time delay function on the output from the second adding means before the first register is updated. In this way it is possible to introduce second order terms in the estimation of the instantaneous position of the vehicle by estimating the changes in the speed of the vehicle for each clock cycle based on measured values of vehicle acceleration.

The time delay function of the fifth register is determined such that the first register is periodically updated at least once every 50 microseconds by adding the contents of the fourth register to the first register in the same way that the contents of the first register are periodically added to the second register.

The instantaneous values of the fourth register represent the change in velocity of the vehicle in the instant cycle and preferably the third and fifth registers (time delay registers) are synchronised and implement the same time delay function such that the registers of the first processing system are synchronised, preferably at a clock speed less than 20 microseconds (50 kHz).

It is preferred that the detector is arranged to operate asynchronously of the control means, that is to say to provide vehicle speed and acceleration updates to the respective first and fourth registers, say 10 times per second, at a significantly lower rate than the clock speed implemented by the respective time delays. It is also preferred that the second system is arranged to operate asynchronously of the first system, that is to say, the illumination timings are derived separately to the estimation of the instantaneous position of the vehicle.

In preferred systems the vehicle comprises a plurality of windows spaced along the length of the vehicle and the second system is further arranged to illuminate individual images when individual image and window locations coincide. The second system is preferably arranged to compare, in real time, the instantaneous estimated position of the vehicle, as determined by the first processor system, with data relating to the position of each image to be illuminated, and data relating to the position of individual windows on the vehicle, which data is preferably stored in memory associated with the control means.

Preferably, the second system comprises means for repeatedly identifying, in real time, the next window of the vehicle to pass each of the display images so that each individual image is illuminated each time the image, and the position of the next window identified to pass that image, coincide. In this way the image display system is bound by the number of images in the sequence of images to be illuminated. The image display system according to this aspect of the invention is not time bound, that is to say for a known number of individual images the system is guaranteed to check the position of the individual images with respect to all the windows of the vehicle in a cycle regardless of the number of windows in the vehicle.

Preferably the means for identifying the next window to be identified is updated to identify the next window, for each individual image, each time that image is illuminated. For example if an individual image has been illuminated because its position coincides with that of window "number 5" on the vehicle, the means for identifying the next window will be updated to identify the next window as window "number 6" on the vehicle. The second processing system is therefore concerned with only one window position for each of the individual images at any one particular time. This is an efficient use of processor resources and readily enables the image display system to operate independently of the number of windows on the vehicle.

In preferred embodiments, the second processing system is arranged to compare the relative position of each individual image in relation to the instantaneous position of the next window identified to pass that image each time the instantaneous estimate of the position of the vehicle is updated by the first processing system. This readily enables the required degree of illumination timing accuracy to be achieved in the image display system of the present invention.

The second processing system may be arranged to allow data relating to the position of the individual images to be manipulated to control the illumination of individual images, for example, in respective portions of the series of images so that illumination positions of the respective portions, relative to the vehicle are different for different portions. That is to say offsetting values may be applied to the data related to the position of the images so that certain images, or different portions of the series of images are illuminated at different positions, relative to the vehicle, as determined by the offset or offset values. This readily enables special effects to be implemented in the motion picture sequence.

According to another aspect of the invention there is provided a copy a control system for an image display system arranged to briefly illuminate successive images of a series of images disposed along the path of a vehicle as the vehicle passes; the said system comprising:

means for receiving output signals from at least one detector arranged to detect the arrival of a vehicle and provide repeated measurements of the speed of the vehicle; and, control means arranged to control the lighting to illuminate images successively as the vehicle passes at illumination timings based on the position of the vehicle along the said path;

wherein the control means comprises processing means including a first system arranged to process the repeated speed measurements to produce an instantaneous estimate of the position of the vehicle along the said path, and a second system arranged to derive the illumination timings from the instantaneous estimate of the position of the vehicle.

According to another aspect of the invention there is provided a method for controlling an image display system arranged to briefly illuminate successive images of a series of images disposed along the path of a vehicle as the vehicle passes; the said method comprising the steps of:

detecting the arrival of a vehicle as it approaches the said series of images disposed along the said path;

determining the speed of the vehicle as it passes along the said path;

processing repeated speed measurements to produce an instantaneous estimate of the position of the vehicle along the said path;

controlling lighting arranged to illuminate images successively as the vehicle passes at illumination timings based on the said instantaneous position of the vehicle along the said path.

Preferably the method further comprises the step of determining the acceleration of the vehicle as is passes along the path, and processing repeated acceleration measurements to provide a second estimate of the instantaneous position of the vehicle based on the measured acceleration and the speed of the vehicle.

It is also known, for example, from WO 02/21488 to provide a series of light sensors positioned along, and perpendicular to, a train track to collect information about the movement of trains passing along the track, for example train speed and position data, as successive sensors are triggered by the presence of the train. Typically the light sensors comprise emitter and detector pairs. It has been found that such sensors can produce inaccurate results due to objects attached to the train, for example pipes or cables. In known arrangements it is possible that a pipe protruding from the front of a train could trigger a sensor prematurely so that the image display system processor controlling the illumination timings wrongly assumes that the front of the train has passed the sensor before it actually has. This would result in premature display of the images. Alternatively, for example, a cable or other coupling part could extend between adjacent carriages of the train and thus cause a light beam from a light emitter part of a sensor to pass through the gap between the carriages an be detected on the other side of the track by the associated light detector later than required to indicate the position of the end of a carriage. Accordingly the speed of the train is now calculated to be slower than the actual speed, because the cable causes the image display system processor to calculate the position of the end of the carriage to have passed the sensor later than it actually has.

According to another aspect of the present invention there is provided a system for determining the arrival of a specified feature on a vehicle at one or more points along a predetermined path of the vehicle, the system comprising: sensor means for detecting the arrival of a feature on a vehicle at the or each point along the path and generating a detection signal; timing means for storing a timing signal representing the time of detection of the feature; and comparison means for comparing the duration of the or each detection signal with a predetermined threshold duration known to be generated by the specified feature, thereby determining the validity of the or each timing signal.

The apparatus therefore includes a means of validating the timing signal by comparing the duration of the detection signal to a predetermined threshold value. Thereafter the timing signal can be used as required if valid or ignored if invalid. The apparatus can therefore help to reduce the untimely generation of detection signals from sensors.

The sensor means may comprise a plurality of sensors positioned a predetermined distance apart at points along the vehicle path. At each point the validity of the timing signal is verified by the checking means before the stored timing signal is used. If two or more spaced sensors are provided then processing means can register valid timing signals and calculate the speed of the vehicle. If three or more sensors are provided then acceleration of the vehicle can be determined by processing means using the speeds calculated between two or more adjacent sets of sensors. Accurate and verified measurements of the position, speed and acceleration of the vehicle can thereby be determined and used to ensure that images subsequently appear at the correct time and position.

The sensor means may comprise one or more light beam sensors such as a laser sensor or an infra-red sensor. Of course other types of sensors such as radio frequency transmitters could be used. All that is necessary is that the status of the sensors is changed upon arrival of a feature on a vehicle.

Where light beam sensors are used the light beam may be unidirectional or may be bi-directional (retro-reflective).

The detection signal may be generated upon occlusion of the light beam by the feature on the vehicle, for example when the front of a vehicle first arrives at the sensor. Alternatively the detection signal may be generated upon clearing of the light beam following occlusion, for example at the end of the vehicle or a carriage thereof, when the light beam is no longer occluded. By taking into account occlusion and clearing of a light beam more frequent timings are generated and a more accurate representation of the vehicle position can be calculated.

In one embodiment the system is adapted specifically for use with a train travelling along a track.

The specified feature may in theory comprise any part of the vehicle, for example the front or the back of the vehicle or a wheel. Most particularly when the vehicle is a train it may comprise a plurality of carriages, in which case the specified feature may alternatively comprise the front or the back of the carriages.

An aspect of the present invention also provides a method of determining the arrival of a specified feature on a vehicle at one or more points along a predetermined path of the vehicle, comprising the steps of: detecting the arrival of a feature on a vehicle and the or each point along the path and generating a detection signal; storing a timing signal representing the time of detection of the feature; and comparing the duration of the or each detection signal with a predetermined threshold duration based on a detection signal known to be generated by the specified feature, thereby determining the validity of the or each timing signal.

In one embodiment of the present invention the method is adapted for use with a train as the vehicle. The vehicle may therefore comprise a plurality of carriages. The specified feature may comprise the front or the back of the vehicle, or may comprise the front or the back of a carriage.

The method may further comprise the step of determining the validity of a plurality of timing signals from a plurality of points a predetermined distance apart and using them to determine the position, speed and/or acceleration of the vehicle.

The system and method of the present invention may form part of an image display system for displaying images to the passengers in the vehicle. The system and method can then be involved in more accurately determining the timings for causing images to appear so that they can be viewed from the vehicle.

Another drawback of known arrangements is that the frame rate is determined as a function of the width of the display board, in other words the frame rate is limited by the image size and the velocity of the passing train. The frame rate is the number of display boards which are lit per second, which can be expressed as a function of train velocity divided by the spacing of the display boards. As the human eye is very sensitive to sudden movement, if the frame rate is less than around 22 frames per second, the resultant display will be perceived by the human eye as a discontinuous moving picture rather than a display of a smooth piece of film. It is therefore necessary to provide at least 22 frames per second in order to produce the best perceived display.

A further consideration is that of safety. Even if a flickering image is desired, it is important that the frame rate is at least 18 frames per second, which is a typically accepted safety level for the avoidance of flash-induced epileptic episodes in affected viewers of the flashing image.

Typically, a prior art display board is of A2 or A3 size, with a width of 667 mm or 573 mm, respectively. Taking the A2-sized display board, even when the display boards are provided immediately adjacent one another, the display will only be a perceived smooth moving picture if the train is moving fast enough to allow at least 22 frames to be displayed per second. In other words, if the speed of the train falls below around 52.8 km per hour, the perceived continuity of the moving picture will be compromised. In the case of A3-sized display boards, the train must not fall below a speed of around 45.4 km per hour in order to present a smooth perceived moving picture. Although the minimum speed of the train may be reduced by decreasing the size of the display boards, reduction of the image size is not a practical option as the image must be large enough to be easily seen by the occupant of the passing vehicle in order for the moving picture to be readily appreciated.

Accordingly, the prior art display systems have the limitation that the display cannot be used where the speed of a vehicle may drop below the required minimum speed to allow at least 22 frames to be passed in a second without a consequential loss in display quality. For example, in the case of subway trains, typically trains travelling along the city centre tracks are only capable of speeds too slow to allow effective use of prior art display devices, due to proximity of stations to one another, bends in the track etc. For example, if the track is old, then the track may even have been designed for lower speeds only. Any of these aforementioned conditions may pose a speed restriction on the trains using that portion of track, thereby resulting in an inability to effectively provide a moving display using prior art image display systems to occupants of a train in regions of the track where, in fact, there are the most passengers.

There is a requirement therefore for a display system which will provide a moving picture display to an occupant of a passing vehicle, the perceived quality of the image being independent of the speed of the passing vehicle.

According to a first aspect of the invention there is provided a display system comprising a digital display device operable to display an image, a speed detector operable to produce a speed signal indicative of the speed of a vehicle having a window passing the display device, a vehicle detector operable to produce a position signal indicative of the position of the vehicle relative to the display device, and processing means connected to receive a signal from the speed detector indicative of the speed of the vehicle and a signal from the vehicle detector indicative of the position of the vehicle window relative to the display device, and operable to displace the image along the display device as the vehicle passes the display device such that the location of the vehicle window and the location of the image on the display device coincide.

The image is shown by means of a back-illumination flash, thereby displaying a 'frozen' image to a viewer.

By coincide, it is intended that the vehicle window is at a location level with the location of the image on the display device such that an occupant of the passing vehicle looking out of the window of the vehicle would be able to see the displayed image by glancing out of the window along an axis substantially perpendicular to the direction of movement of the passing vehicle. At this point, the display is 'flashed' by a back-light of sufficiently short duration to freeze the image to the viewer.

Through the use of a digital display device, the image can be moved along the display device rather than the image being presented on separate display boards as is typically the case in the prior art. Thus, the use of a display system according to the present invention is not subject to the same vehicle speed limitations as prior art systems that are constrained by the width and separation of the display boards. Instead, if the vehicle slows down, the speed at which the image is moved along the digital display device is also slowed down in a corresponding manner such that the image and vehicle remain in a constant position relative to one another, thereby maintaining a smooth perceived image for the occupant of the vehicle and avoiding flicker of the image.

As well as providing a smoother image with less flicker even when the passing vehicle is moving at slow speeds, if the frame rate is increased, a brighter image is generated.

The image may comprise a single frame continuously displaced along the length of the digital display device so as to display a static picture such as an advertising poster or the like to an occupant of the passing vehicle. However, more preferably, the image comprises a series of frames (sequence of images) making up a moving picture wherein the display device is operable to display the next frame in the series at a position on the display device relative to the position at which the previous frame was displayed determined by the speed of the vehicle as the vehicle passes the display device such that as each frame is displayed in sequence, the location of each frame on the display device coincides with the position of the vehicle window as the vehicle passes the digital display device.

Preferably the minimum frame rate is 22 frames per second. However, any suitable minimum frame rate may be selected. A more preferable minimum frame rate is 25 frames per second.

In this way an occupant of the passing vehicle will perceive a smooth continuous moving picture as each frame is flashed consecutively and in line with the position of the window of the passing vehicle.

The display system may further comprise a plurality of windows such that an image is displayed on the digital display device to coincide with the position of each window of the vehicle. This allows the moving picture to be appreciated from more than one window position within the passing vehicle, thereby maximising the audience to which the moving picture may be displayed.

The digital display device may comprise a single digital display screen.

Alternatively, the display system may comprise a plurality of digital display screens. By the use of multiple digital display screens, the limitation of the relationship between image size and frame rate is removed as digital display technology makes it possible to display frames which span two or more screens. As the train passes the digital display device, a frame may be displayed by providing a single frame spanning two or more digital display screens.

Preferably, the screens are arranged substantially adjacent one another. More preferably, the screens are arranged such that the adjacent edges of neighbouring screens abut one another. In this way, since the frame position relative to the screens varies as the image moves along the display device, the screen borders are not noticeable to a viewer of a frame sequence.

The digital display screen may comprise an LCD screen or a TFT screen. However, any other suitable digital display screen available to the skilled person may be used. Furthermore, any combination of any suitable digital display screens may also be used in the event that a plurality of digital display screens are employed in a display system according to the present invention.

The location of the frames of an image sequence changes dependent on the speed of the passing vehicle. For example, the second frame of an image sequence will be displaced relative to the position of the first frame by a greater amount when the passing vehicle is moving at a higher speed than it would if the passing vehicle were travelling at a lower speed.

This may lead to the situation where a blank section of the frame, where the border between digital display screens occurs, repeatedly appearing in the same place in the image on sequential frames of an image series or progressively moving across the image. When this happens, the blank section becomes noticeable and distracting to the viewer.

In order to compensate for the missing section of the frame, where the border between digital display screens occurs, a non-linear frame-rate may be implemented that advances or delays the point in time at which the frame in an image sequence is flashed, thereby altering the position of the missing section of the frame on the digital display screens. As this ensures that the missing section of the frame is not repeatedly occurring in the same position in consecutive frames or progressively advancing across the frame on consecutive frames, the borders of the digital display screens remains unnoticeable to the viewer and distraction is avoided.

However, the advancing or delaying of the point in time at which a frame is flashed may result in a flickering image due to the increased time interval between some frames and an occasionally brighter image due to a decreased time interval between some frames.

To compensate for these perceived effects of a non-linear frame rate, a new frame may be inserted between the two adjacent frames with an increased time interval between them. The new frame is interpolated from the two adjacent frames and has an intensity profile across the image thereby harmoniously compensates for the missing section of frame. In this way, the perception of the border of the digital display screen to a viewer is avoided.

A further aspect of the present invention provides a method of displaying an image comprising the steps of
  providing a digital display device operable to display an image thereon;
  providing a speed detector operable to produce a speed signal indicative of the speed of a vehicle passing the display device;
  providing a vehicle detector operable to produce a position signal indicative of the position of the vehicle relative to the display device;
  providing processing means in connection with the speed detector and the vehicle detector and operable to receive a signal indicative of the speed of the vehicle and a signal indicative of the position of the vehicle;
  generating an output signal to displace the image along the digital display device as the vehicle passes the display device such that the position of the vehicle window and the location of the image on the digital display device coincide, the image being displayed by means of a back illumination flash.

An embodiment of the present invention will now be more particularly described, by way of example only, and with reference to the accompanying drawings, in which.

Figure 1:
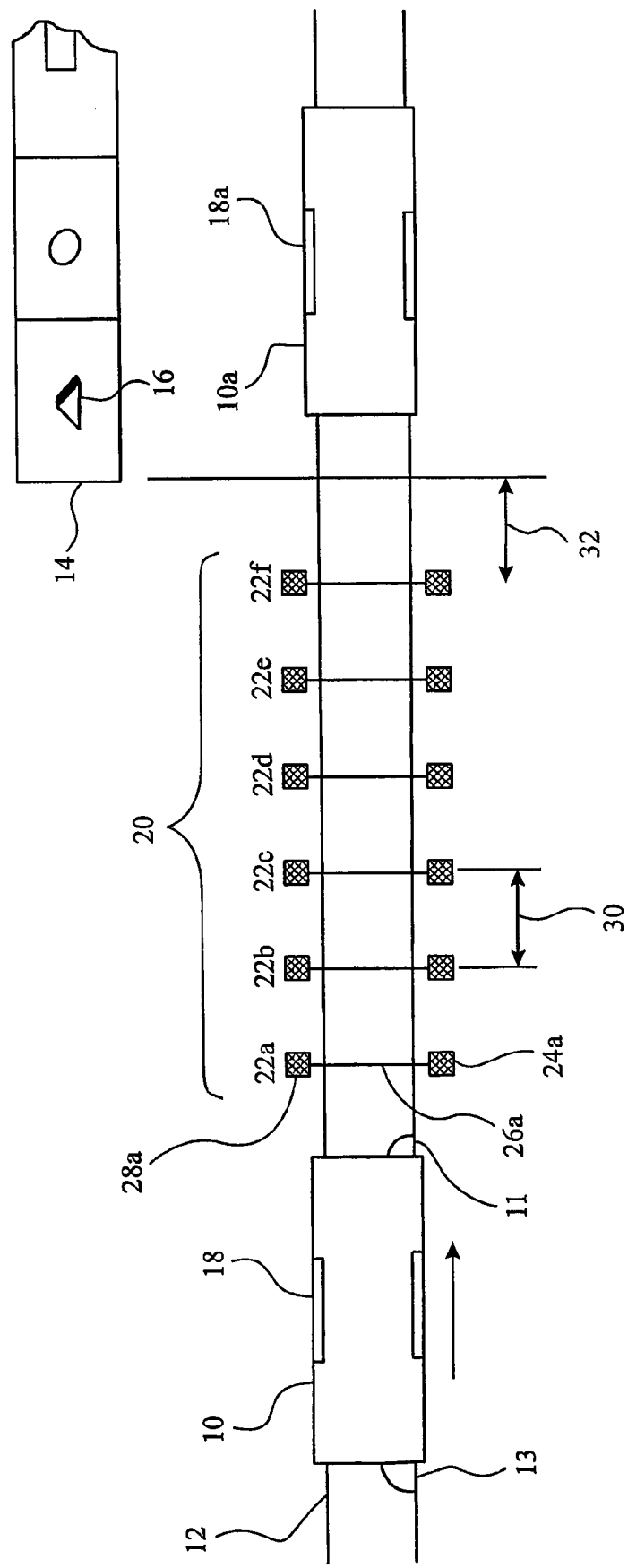
FIG. 1 is a diagrammatic representation of an image display system for which the system and method of the present invention is suitable.

Referring first to FIG. 1 there is shown an image display system utilising the system and method according to the present invention.

A train 10 is shown in a first position travelling along a track 12 in the direction shown by the arrow. The same train is indicated 10a at a second position further along the track 12.

At the side of the track 12 are positioned a plurality of image display boxes 14 incorporating images 16 to be displayed. In order that the images 16 can be viewed from the train 10a the image display light boxes 14 must illuminate their respective images 16 at a time the image 16 is visible through a window 18a in the train 10a. In order for the images 16 to be displayed sequentially and at the right time several pieces of information must be known and processed.

The position, velocity and acceleration of the train 10 as it approaches the image display elements 14 is determined using an array of sensors 20. Each sensor 22a-22f of the array 20 comprises a transmitter 24 for transmitting a light beam 26 to a receiver 28. The transmitter 24 and the receiver 28 are located either side of the track 12 so that the beam 26 is transmitted across the track 12.

As the train 10 arrives at the first sensor 22a in the array 20 the front 11 of the train 10 breaks the light beam 26a and the receiver 28a registers that the sensor 22a status has changed. As the train 10 progresses along the track the remaining sensors 22b-22f are sequentially occluded by the front 11 of the train. In addition, as the train 10 passes along the track the sensors 22a to 22f will become clear once the back 13 of the train 10 arrives. The receivers 28 then register that the respective beam 26 has been reinstated. In this embodiment the distance 30 between adjacent sensors is smaller than the length of the train. Accordingly, for example, the sensor 22a will still be occluded when the front 11 of the train arrives at the sensor 22b.

Because the sensors 22a-22f within the array 20 are located a predetermined distance 30 apart the position and the velocity of the train can be calculated. In addition, by using the sequential velocity calculations the acceleration of the train 10 can be determined. Using the timings at which the beams 26 are occluded or cleared, the position, velocity and acceleration of the train 10 can then be processed. Together with information such as the distance 32 from the final sensor 22f in the array to the first box 14, the position of the boxes 14 and the position of the window 18 relative to the front 11 of the train 10, the timings for displaying the images 16 can be calculated so that they appear in the window 18a, by allowing prediction of the movement of the train as it subsequently passes the display boxes 14.

Figure 2:
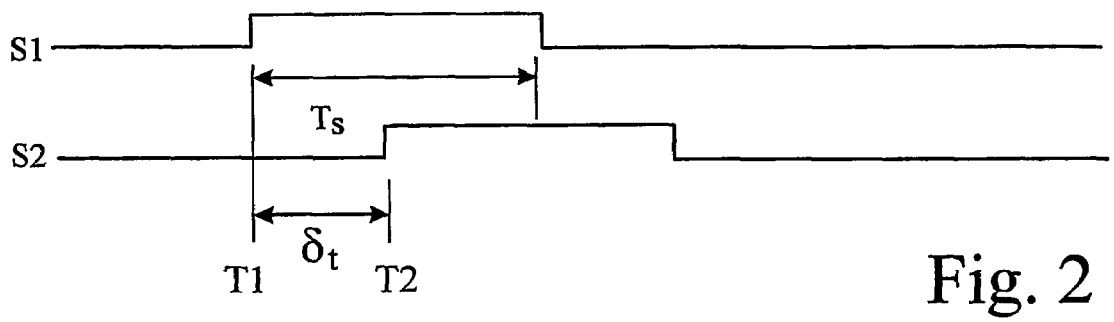
FIG. 2 is a diagrammatic representation of two signals generated by adjacent sensors on arrival of a specified vehicle feature.

Referring now also to FIG. 2, there is shown a diagrammatic representation of ideal signals received from the adjacent sensors 22a, 22b of FIG. 1. Signal S1 represents the signal received from the sensor 22a and signal S2 represents the signal received from the sensor 22b. As the front 11 of the train 10 arrives at the sensor 22a the beam 26a is broken at timing point T1. The front 11 of the train 10 causes the status of the light beam 26 to change for a period of time $T_s$, starting at T1, determined by the length of the carriage. An identical signal is generated from the sensor 22b at a later time, with the start of the signal indicated T2. The change in time between T1 and T2 can be used by a processor (not shown) to determine the velocity of the train 10.

Figure 3:
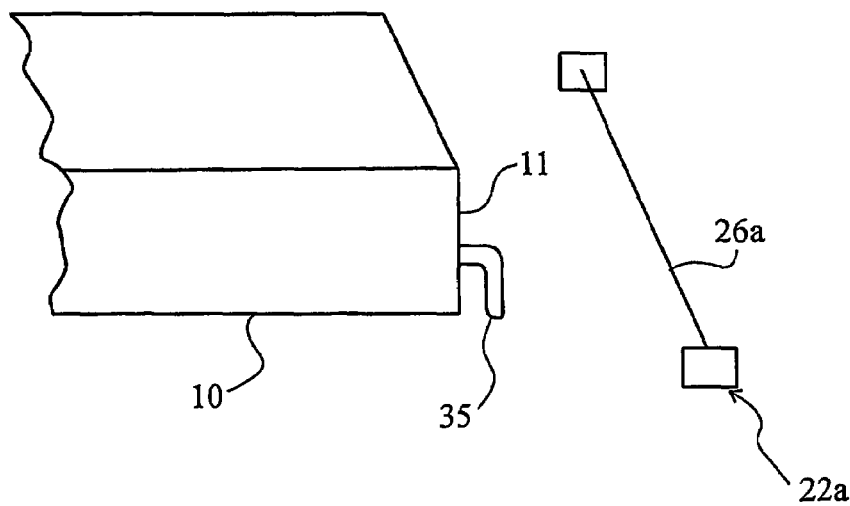
FIG. 3 is a perspective view of a train including an unexpected, interfering object arriving at a sensor point.

Referring now to FIG. 3, there is shown a perspective view of the front 11 of a train 10 as it approaches a sensor point 22a. Projecting from the front 11 of the train 10 is an unexpected feature in the form of a pipe 35. It will be seen that as the train 10 arrives at the sensor 22a the beam 26a will first be briefly occluded and then cleared due to the presence of the pipe 35 before the front 11 of the train 10 arrives.

Figure 4:
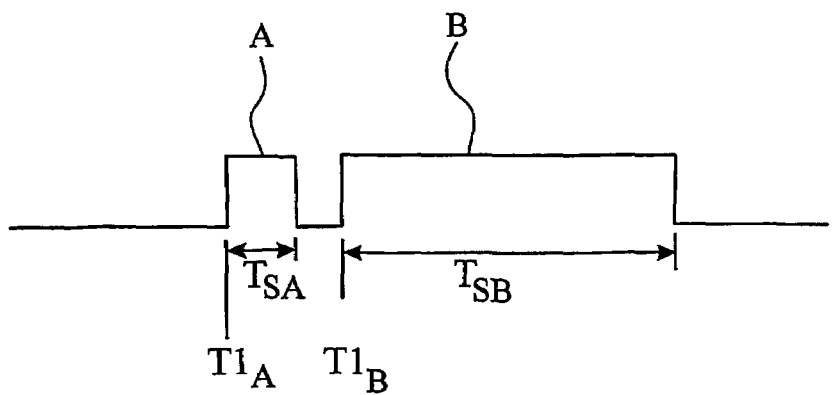
FIG. 4 is a diagrammatic representation of a signal generated by the sensor of FIG. 3.

Referring now also to FIG. 4, the sensor 22a of FIG. 3 generates invalid signal A with start time $T1_A$ and time period $T_{SA}$ due to the pipe 35, and valid Signal B with start time $T1_B$ and time period $T_{SB}$ due to the front 11 of the train 10. If signal A is used to calculate the time of arrival of the front 1 of the train 10 then the position of the train will be determined to be further along the track than it actually is.

Figure 5:
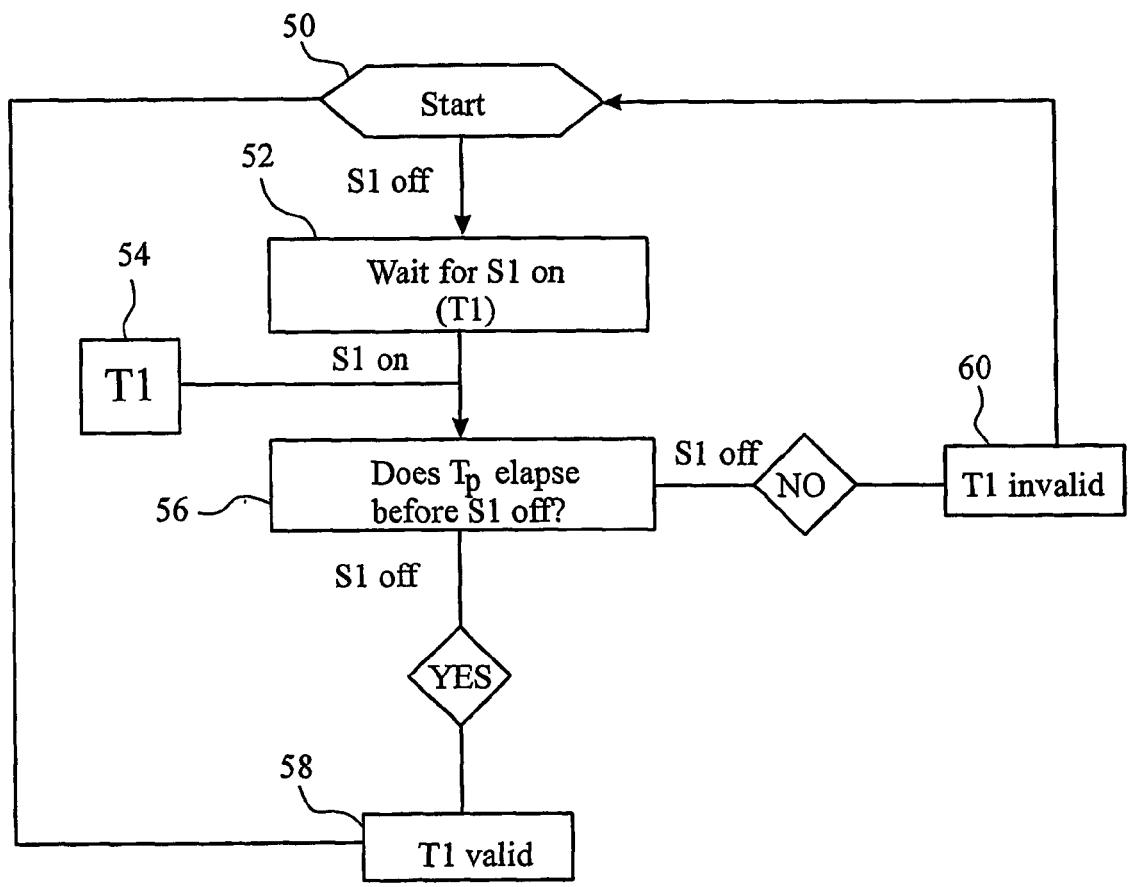
FIG. 5 is a flowchart illustrating a method of validating a timing signal from a sensor.

FIG. 5 is a flow chart illustrating the steps involved in detecting and validating the time of arrival of the front 11 of the train 10 at the sensor point 22a using the system of the present invention.

The system starts at step 50 and in this state the signal from the transmitter 24a is being received by the receiver 28a. The signal S1 is therefore OFF. The system enters a standby mode at step 52, waiting for the sensor 22a to generate a signal pulse indicating that the receiver 28a is no longer receiving the beam 26a. When this signal pulse is generated the time of the commencement of the signal is saved as T1 by a timer at step 54. The system now waits for the beam 26a to be re-established at step 56 and begins to monitor the predetermined threshold time period $T_p$. If time period $T_p$ elapses before the signal pulse ends and S1 is OFF then T1 is deemed to be valid. In this case the final time period $T_S$ for the S1 pulse is not required, because the system only needs to know that the period $T_S$ will be longer than $T_p$. If, however, $T_p$ is longer than $T_S$ then the time period T1 is invalid. $T_s$ is only calculated, therefore if $T_p$ is not reached. As the beam 26a is re-established the system cycles back to the start 50 and awaits a further occlusion. The value of $T_p$ is calculated on the basis of an expected time period for beam occlusion if the feature which caused the occlusion is the front 11 of the train 10. The beam will be occluded for a relatively long period of time if the body of the train 10 occludes the beam when compared to an interfering object such as a pipe.

In the example shown in FIG. 4, as the train 10 approaches the sensor the pipe 35 initially breaks the beam 28a which produces signal pulse A indicating that a feature (unspecified) has arrived at the sensor point. The pipe 35 generates a time period $T_{SA}$ which is smaller than $T_p$. The answer to the question at step 56 is 'no' and a timing signal $T1_A$ stored at step 54 is ignored; the system then returns to step 50 and awaits a further occlusion at step 52.

Because the system re-sets to start step 50 following calculation of $T_{SA}$ for signal A the system is ready to receive signal B as the time at which the front 11 of the train arrived at the sensor point. As the system passes from step 52 to step 56 an updated value for $T1_B$ is stored at step 54. The period of time $T_{SB}$ following the start time of signal B $T1_B$ is greater than $T_p$ so that $T_p$ must elapse before signal pulse B ends. The signal B therefore passes through to step 60 and the time period T1 in step 54 is deemed valid. $T_p$ is greater than the width of the pipe 35 but less than the distance between adjacent sensors.

Figure 6:
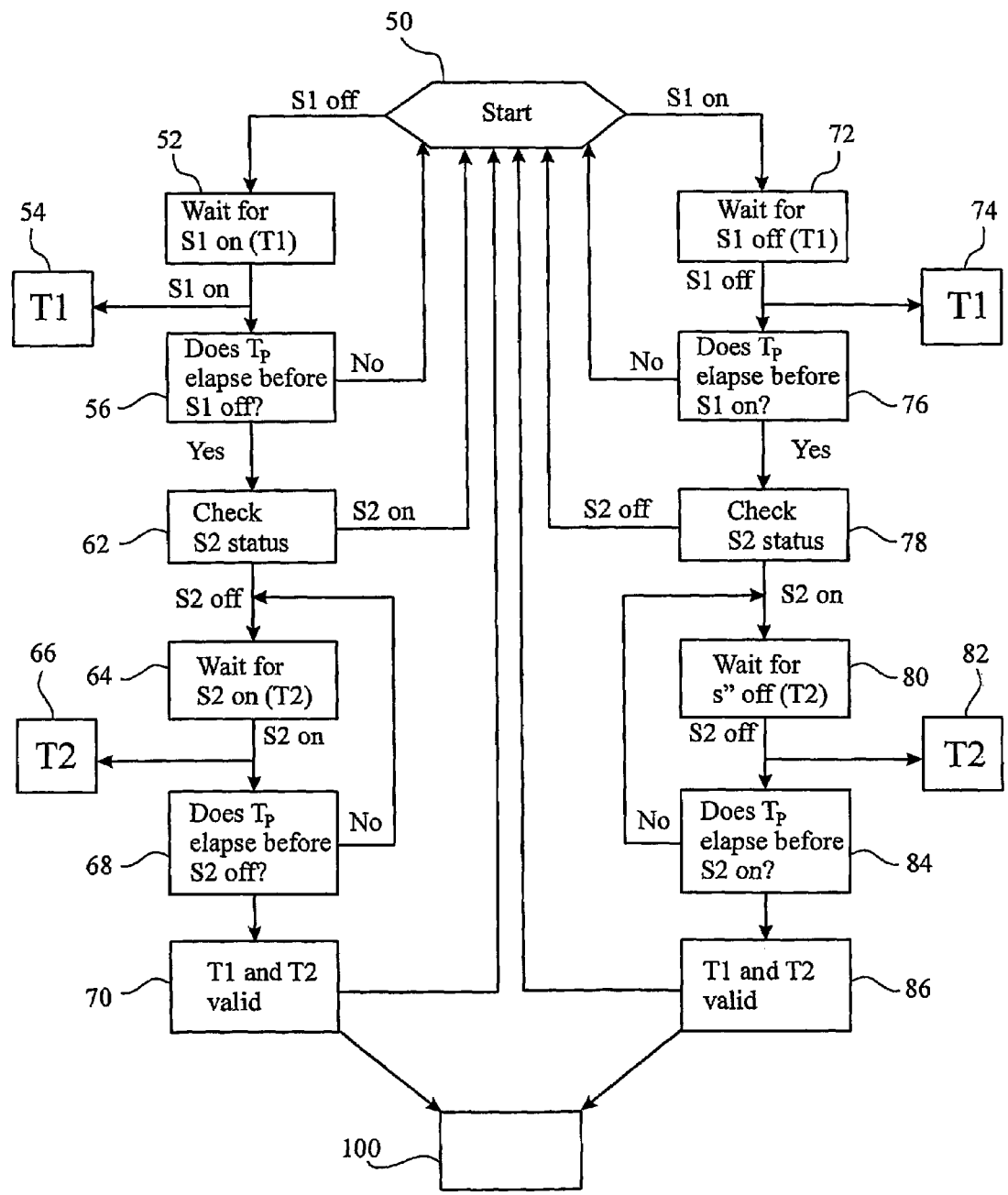
FIG. 6 is a flowchart illustrating a method of validating timing signals from sensors, according to an alternative embodiment.

In FIG. 6 there is shown a flow chart illustrating the way in which the system works with two adjacent sensors, each required to provide respective timing signals T1 and T2 for both the front and back of a train carriage.

The system depicted in FIG. 6 has two paths, depending on whether S1 is initially ON or OFF. This has the advantage that features causing the beam occlusion work also with beam clearing. For example, in a train in which the specified feature is the gaps between carriages detection occurs at the start of the train when the beam is occluded and then at the end of each carriage when the beam is cleared. The start of subsequent carriages is ignored as it occurs during processing of the previous feature when the distance between the sensors is less than the length of the carriage. A train with n carriages will enable n+1 features to be determined.

As the train approaches the first sensor the signal S1 from the first sensor 22a and signal S2 from the second sensor 22b are both OFF; that is, their respective beams 26a, 26b are clear and the receiver 28a, 28b is receiving the beam 26a, 26b from the transmitter 28a, 28b. The system therefore begins down the left hand side of the flow chart by waiting for the S1 signal to register a change in status at step 52, indicating that a feature has arrived at the sensor point.

When a feature arrives at the sensor point 22a the signal S1 moves to its ON status indicating that the light beam 26a has been occluded. The time T1 at which the feature arrives is stored at step 54. At step 56 the system checks to see if the predetermined time period $T_p$ has expired. If S1 changes back to OFF before $T_p$ has elapsed T1 stored at step 54 is invalid. The system returns to step 50 to check the initial status of S1. If $T_p$ elapses before S1 changes back to OFF the value of T1 stored at step 54 is valid.

At step 62 the system checks the status of the signal S2 from the second sensor 22b. The system assumes that the sensor will be OFF at step 62 because $T_p$ is less than the time taken to travel between the two sensors. If the sensor is ON the system returns to step 50 to check the status of S1.

Assuming that the status of S2 is OFF the system waits at step 64 for S2 to detect the vehicle feature and move to its ON status. The time T2 at which the feature arrives is stored at step 64. At step 68 the system checks to see if the predetermined time period $T_p$ has expired. If S2 changes back to OFF before $T_p$ has elapsed T2 stored at step 66 is invalid. The system returns to step 64 to wait for a further occlusion. If $T_p$ elapsed and S1 is still ON the value of T2 stored at step 66 is valid.

If both T1 and T2 are valid the system will run from step 50 through to step 70. At this point a processor 100 can use T1 and T2 to calculate δT and then the speed of the vehicle. $T_p$ should be less than δT.

The right hand side of the flow chart is the mirror image of the left hand side because it monitors timings starting from the assumption that the beam is occluded, so that, for example, the arrival of the back of a vehicle can be detected. The process is the same in that timing signals T1, T2 are validated by comparing the duration of signals S1, S2 with predetermined time period values.

In order for the system to flow down the right side of the flowchart the signal from S1 is initially ON, indicating that the beam is occluded. The system waits for S1 to turn OFF at step 72. When the beam clears the time period T1 is stored at step 74. If, for example, the feature the system is looking for is the back of a train carriage then the system will expect a time period $T_p$ based on a gap between the rear of the carriage and the front of the next carriage. If this is the case and $T_s$ is less than $T_p$ then the system ignores T1 and returns to step 50 to wait for the beam to clear again. If the time period $T_s$ is equal to or greater than the period $T_p$ the system deems T1 valid and proceeds to step 78. Similarly for the signal S2 the validity of the timing signal T2 stored at step 82 is determined.

No signal is sent to the processor unless the values of T1 and T2 are both valid. Once the processor receives a signal, therefore, it can always proceed to calculate the position, speed and acceleration of the vehicle. Once T1 and T2 have been declared valid the system returns to step 50.

The validity checking steps 56, 76 for the T1 values serve as stop points for the system if T1 is invalid. That is, if T1 is invalid the system will not proceed to steps 62 and 78.

Depending on the status of the first sensor when the second sensor is reached the system can switch from the left hand side of the flow chart to the right hand side. The system automatically flips between the two sides of the chart depending on the status of the signals.

The system may further include timeout periods at steps 64 and 80 so that if the signal S1 has accidentally triggered then the system re-sets after a set time rather than continuing to await signal S2. Also, in cases where a signal is unlikely to be corrupted $T_p$ can be disabled at any of the steps 56, 68, 76 or 84 if required.

In this embodiment the system detects edges; that is, the front or back edges of a train or the carriage.

Additional steps could also be added to ensure that the signals S1 and S2 fall within a predetermined time window after a previous detection event to abrogate the effects of serious interfering objects, such as a pantograph half way along a carriage roof.

The solution to the problem of invalid timings is therefore to traverse a decision tree as the signals are generated. The algorithm and decision tree for a particular vehicle can be derived by prior knowledge of the vehicle and its features.

Figure 7:
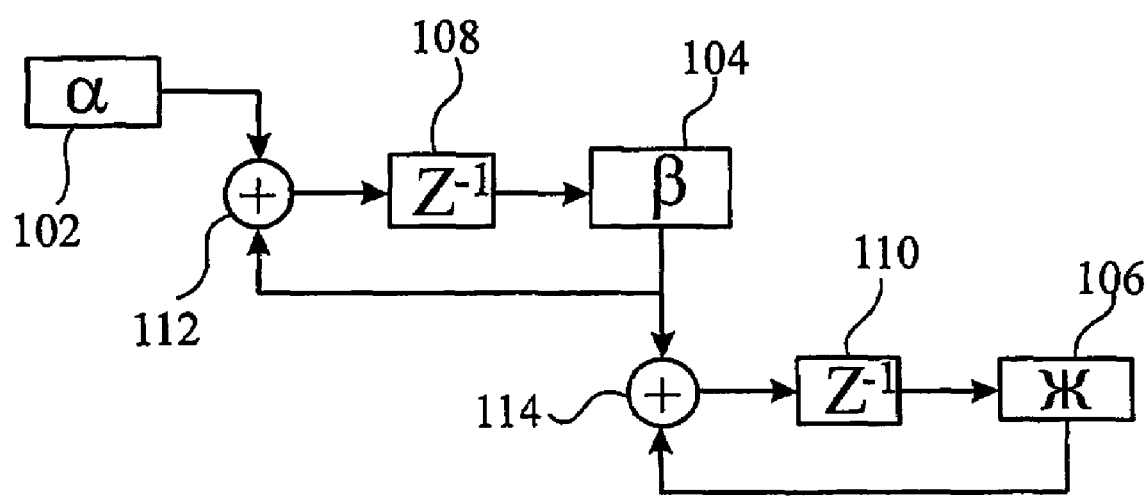
FIG. 7 is a block diagram of a first processor system of a control unit for an embodiment of an image display system of the present invention.
Figure 8:
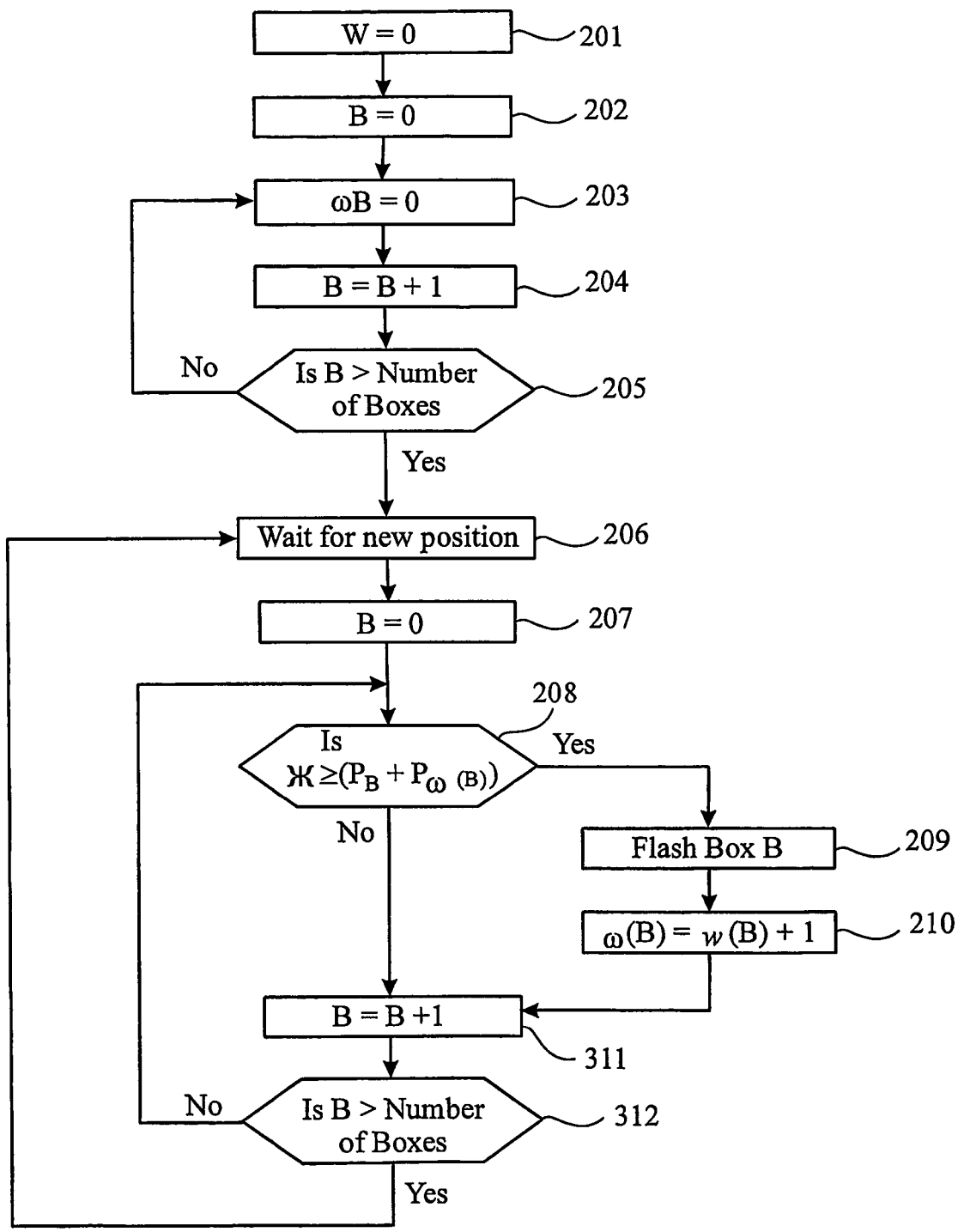
FIG. 8 is a flowchart representing an algorithm implemented in a control unit for an embodiment of the present invention.

An embodiment of a control unit for an image display system of an aspect of the present invention will now be more particularly described, by way of example only, with reference to FIGS. 7 and 8 of the accompanying drawings.

Updated values for velocity and acceleration derived from the sensors 22 are used to generate timing pulses to fire the Xenon flash lamps in the display boxes 14 in real-time.

In an embodiment of an image display system according to an aspect of the present invention, a control unit, which is may be in the form of a microprocessor 100 or a gate array, includes a first system, as shown in FIG. 7, which is arranged to process the repeated speed and acceleration measurements of the train 10 to produce an instantaneous estimate of the position of the train along the track, and a second system, as described with reference to the flowchart of FIG. 8, which is arranged to derive the illumination timings from the instantaneous estimate of the position of the train derived by the first system. Dividing the processing functions of the control unit is advantageous as it allows the functions to be implemented independently of each other, although the second system of course requires input data concerning the instantaneous position of the vehicle from the first system.

The implementation of the first system is based on the solution of the equation of motion as represented by the second order equation:

$$s = \int\int a \cdot dt^2 + \int v \cdot d_t + k \qquad (1)$$

that is to say, for position s at a given time t, where a and v are instantaneous values of acceleration ($d^2s/dt^2$) and velocity (ds/dt) respectively and k is the initial position or offset where the train is first detected.

The generation of display pulses using this position information and the known position of both windows and display boxes is implemented by the second system.

In the first system the integration is performed numerically and the number of calculations is reduced by rearranging equation (1) to give:

$$s = +\int (v + \int a \cdot d_t) \cdot d_t + k \qquad (2)$$

The integrations are definite (from 0 to t) and in numerical terms, with discrete time units δT, the equation of motion may be represented:

$$s = \sum_{T=0}^{t} \left(v + \sum_{T=0}^{t} a \cdot \delta T\right) \cdot \delta T + k \qquad (3)$$

As δT remains constant v and a may be appropriately scaled thus:

$$V = v \cdot \delta T \qquad (4)$$

and:

$$A = a \cdot \delta T \qquad (5)$$

The summation is performed in steps of δT therefore, equation (3) is simplified to:

$$s = \sum^{t} \left(V + \sum^{t} A\right) + k \qquad (6)$$

This calculation is implemented in the control system using the architecture shown in the block diagram of FIG. 7.

In FIG. 7 blocks 102, 104 and 106, marked α, β, and Ӂ are registers which are loaded and read by the control unit, for example the microprocessor 100, and are preferably of arbitrary resolution.

Blocks 108 and 110, marked $Z^{-1}$, are registers of appropriate resolution which implement a time delay of δT. Registers 108 and 110 implement a time delay of the type represented by the transfer function $G(s) = e^{-sT}$ where T is the delay time, where $Z = e^{sT}$ as is well in known in the art. In this embodiment the time delay is preferably less than 50 microseconds, and typically 16 microseconds so that the clock frequency of the cascaded array of registers shown in FIG. 7 is 62.5 kHz.

Initially registers 102, 104 and 106 are loaded with the initial values of A, V and k respectively, appropriately scaled as described above.

Thereafter registers 102 and 104 are loaded with the updated values of A and V as they are calculated from measurement values by the other processes in the system. The values of A and V are updated at a much lower frequency then the clock speed of the time delay registers 112, 114. Typically the values of A and V are updated say 10 times per second.

Blocks 112 and 114 are adders which respectively add the values of register 102 and 104 and the values of registers 104 and 106 every clock cycle, as determined by the time delay registers 108 and 110, to update the registers 104 and 106 respectively.

Register 106 therefore gives the instantaneous value of position of the vehicle along the track with respect to an initial reference position.

The implementation of the first processing system has the following advantages: i) acceleration values may be updated at any time; ii) velocity values may be updated at any time; iii) the value of $\delta T$ is limited only by the speed of the adders 112 and 114 and may therefore be very small; iv) resolution of acceleration, velocity and intermediate results may be arbitrarily defined and is independent of $\delta T$; and, v) velocity and position values are available to external processes at any time.

The data generated by the first processing system is used to generate the display pulses in the second processing system by continually comparing the current position (given by register 106) with data which represents the coincidence of a particular window with an individual display box containing an image to be illuminated.

In a preferred embodiment the function of the second processing system is implemented using the algorithm shown in FIG. 8, where:

W identifies a particular window on the train.
B identifies a particular display box containing an image to be illuminated on the tunnel wall.
$\omega(B)$ represents the next window to pass display box "B".
$P_B$ represents the position of display box B with respect to the reference position.
$P_{\omega(B)}$ represents the position of the next window to pass display box B, that is to say the position of that window on the train.
$X$ represents the instantaneous value of position as calculated in register 106 as described above.

The algorithm shown in FIG. 8 operates as follows:

The algorithm is initialized before a train passes the image display system, for example when the arrival of a train is detected by the first sensor 22a in the array of detection sensors 20. W and B are initialized to zero in steps 201 and 202 and in steps 203 to 205 the values of $\omega(B)$ are initialized to zero for all the display boxes.

The algorithm waits at step 206 until a new position of the train is estimated by the processing system of FIG. 7; this only happens after a train is detected. In step 207 the box count (B) is reset to zero. Steps 208 to 212 are repeated for each display box before returning to step 206 to wait for the train to move to the next position, that is to say until the register 106 is next updated.

During step 208 it is determined if the train has moved such that the position of the next window to pass the current display box under consideration coincides with that display box. If so, a flash is generated in step 209 for that display box and $\omega(B)$ is set in step 210 to point to the next window on the train that is to pass that particular display box.

The algorithm ends when the last window on the train passes the last box or a time out elapses (not shown in the flowchart), after which the algorithm waits for the next train.

An important aspect of this algorithm is that it is bounded by the number of display boxes per control system, that is to say the number of individual images, and is independent of the number of windows on the train. It is only necessary that both the display boxes and windows are in the correct sequence as recognized by the control unit.

More importantly, because the number of states is bounded, the algorithm may be implemented by a state machine, which operates in finite time; and can therefore be implemented to coincide with each step of the position generator described previously with reference to FIG. 7, thereby providing the necessary degree of accuracy.

The central system as described above may be improved by any combination of the following additional functions.

In addition to instantaneous access, the first processing system (with suitable synchronising registers) may be configured to allow the simultaneous update of any combination of position, velocity and acceleration values. This allows any algorithm used to process measurements and calculate acceleration and velocity to: i) compare positions of events with actual ones, using the error to dynamically control the equation of motion (1); ii) monitor performance and apply meaningful physical limits to acceleration and any discontinuities in velocity or position; and iii) avoid discontinuities altogether by modifying acceleration only, using feedback from both velocity and position errors.

The implementation of the first processing system shown in FIG. 7 has a clear structure whereby the acceleration processing is a cascaded element to the velocity processing. This may be extended by cascading additional elements, effectively adding third, or higher order integrations to the equation of motion. This may be useful for the following reasons: i) the physical causes (e.g. rate of change of acceleration due to application of brakes etc.) may be known and added to the model used to process the measurements; ii) higher order terms may allow better dynamic control; and iii) higher order terms may assist stability of the overall system.

The algorithm illustrated in FIG. 8 uses values of $P_B$ that represent the position of the display boxes on the tunnel wall. Variation of these gives the following advantages. Allowances may be made for irregular spacing of the display boxes, such as to avoid a physical obstruction on tunnel walls.

The values may be changed to represent the virtual position of the box relative to the train. This is important, for example, when part of the display is situated on a curved section of tunnel. In this case equally spaced boxes will appear in different positions, relative to their projection onto a curve of larger or smaller radius. This error can be abrogated by using values of $P_B$ that compensate for the difference between arc lengths.

By applying a mapping function to the set of values the virtual position of any particular display box may be moved. As each display corresponds to an individual frame (which is fixed in time in the sequence as perceived by the viewer); this provides a simple method whereby the position of the display relative to the window may be made to follow a predetermined function of time.

For example, in order to move portions of the display (as presented to the viewer), the mapping function $f(t)$ is simply the difference between the real and virtual positions and is defined by the following equation:

$$f(t)=p(t)-P \quad (7)$$

where t is the time into the sequence of images, P is the normal position of the display with respect to the window, p(t) is the required position as a function of t Then, by applying the function to values of $P_B$ to generate new values $P_B'$ gives:

$$P_B'=f(T_B)+P_B \quad (8)$$

where $T_B$ is the time associated with the frame represented by display box B, given by:

$$T_B=B/F \quad (9)$$

Where F is the frame rate.
Combining (8) & (9);

$$P_B'f(B/F)+P_B \quad (10)$$

Hence by simply selecting an appropriate mapping function f(t), and using the "virtual" values $P_B'$ in the equation of step 208 the algorithm implements any manipulation of the image which may be derived or desired.

Figure 9:
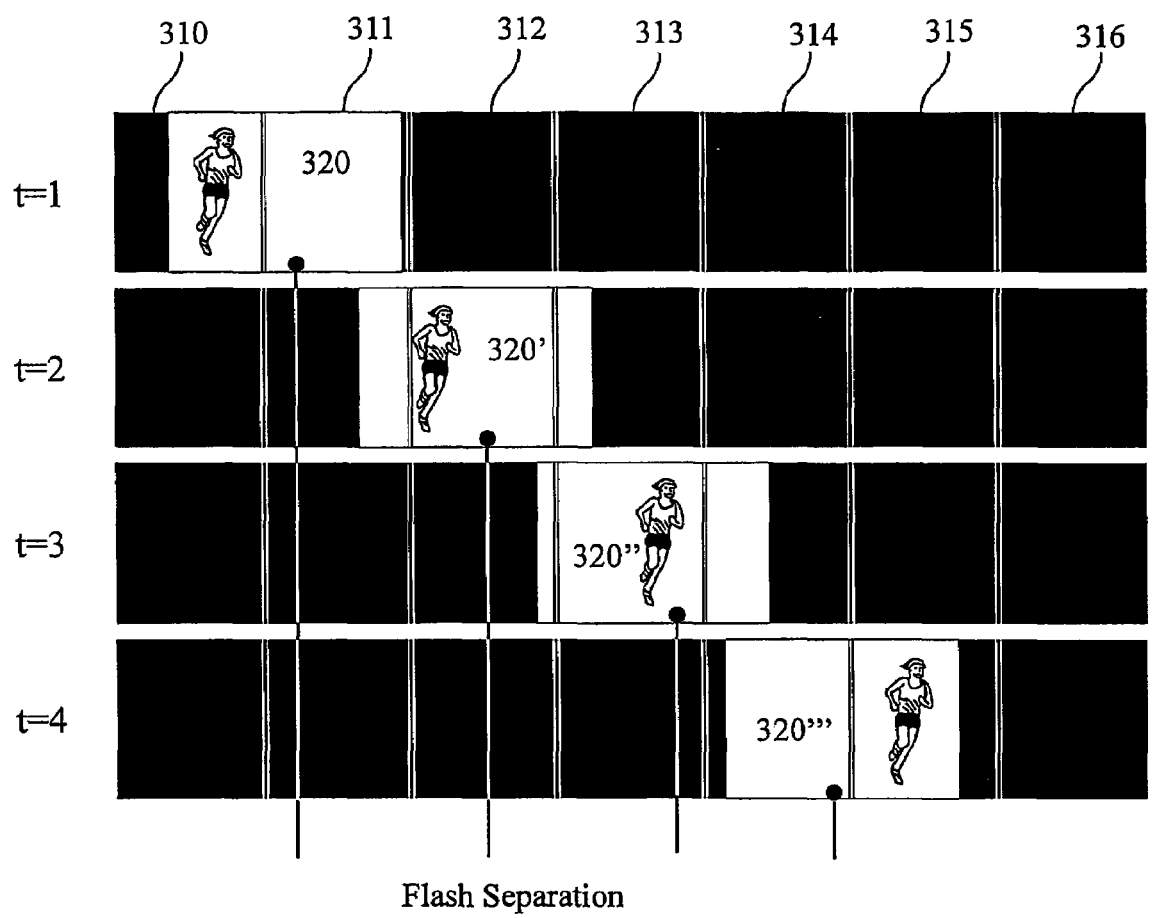
FIG. 9 is a drawing illustrating an image being displaced along a display device of an embodiment of a display system according to the present invention.

FIG. 9 shows a display system according to the present invention, comprising a digital display device 300 composed of an array of digital display screens 310-316 on which is shown an image made up of a series of frames 320. As the frames 320 are displayed in sequence over time, the frames 320, when viewed by a viewer, will appear to make up a moving picture.

The frames 320 are shown in sequence on the display device 300 and each sequential frame is displayed at a position on the display device 300 displaced in the direction of movement of a passing vehicle (not shown) from which an occupant is viewing the display device 300, relative to the position of the previous frame on the display device 300. The amount of displacement of each frame relative to the previous frame in the image sequence is determined as a function of the speed of the vehicle and hence the location of a window on the vehicle from which an occupant is viewing the display device, such that the location of the window of the vehicle coincides with the position of the frame 320 being shown and, as the vehicle passes the display device 300, the position of the vehicle relative to each sequential frame 320 remains constant.

The digital display device 300 comprises one or more digital display screens such as LCD or TFT screens and the like. Each individual frame 320 of an image sequence is shown on the digital display device 300 by back lighting using strobe lamps that flash simultaneously to display the whole frame 320 on the digital display screen 300. As the vehicle passes the digital display device 300, each frame 320 in the image sequence is moved along the digital display device 300 and shown by flashing the strobe lamps at the appropriate positions on the digital display device 300 to create a moving picture as viewed by an occupant of the passing vehicle.

In the non-limiting example shown in FIG. 9, the minimum frame rate of 22 frames per second has been used. However, it will be readily appreciated that any preferred minimum frame rate may be selected.

At time, t=1, a frame 320 is shown spanning digital display screens 310 and 311, with lamps behind screens 310 and 311 flashed to display the frame 320. At time, t=2, the next frame 320' in the image sequence is displayed on the display device 300. However, rather than being shown at the same position on the display device 300 as the previous image, the next frame 320' is moved along the display device 300 and shown at a position on the display device 300 by an amount corresponding to the position of the window of the vehicle at time t=2, to span digital display screens 311, 312, 313, with lamps behind 311, 312 and 313 flashed to display the frame 320. The position of the window of the vehicle at time t=2 is calculated by detecting the position and speed of the vehicle using suitable detectors (not shown) so as to determine where to display the frame 320' such that the frame 320' will coincide with the new window position. Again, at times, t=3 and t=4, the next frames 320" and 320''', respectively, in the image sequence are shown at suitably displaced positions relative to the previous frames 320' and 320", respectively, such that each frame 320" and 320''', respectively, when displayed, coincides with the position of the window of the passing vehicle at the time of display.

Figure 10:
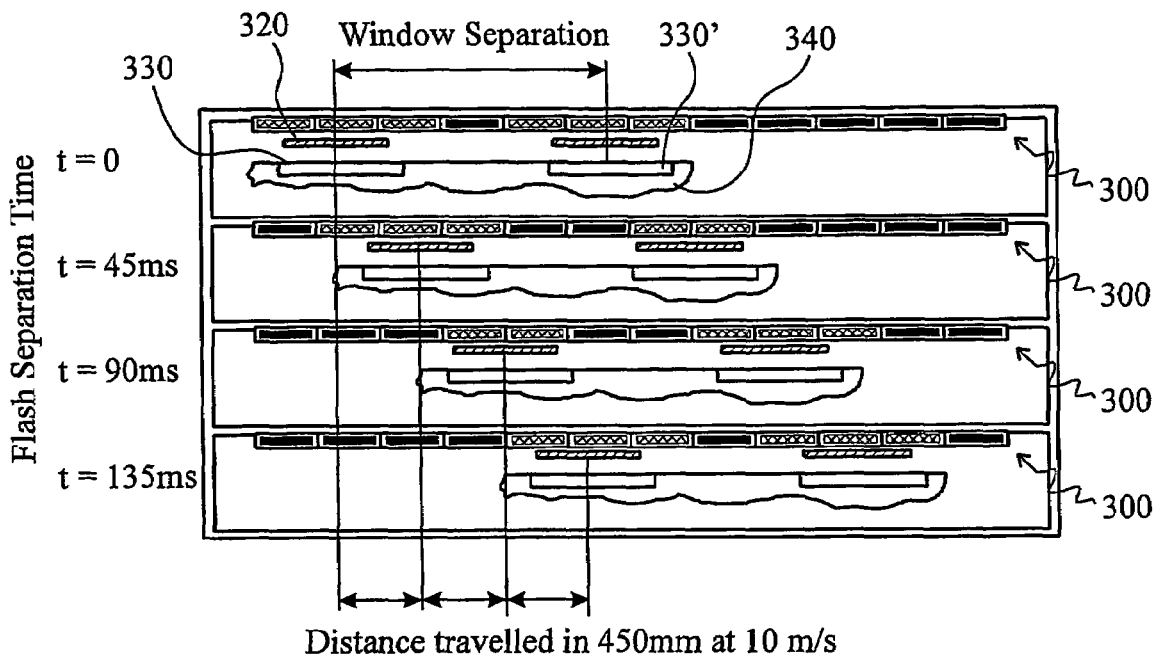
FIG. 10 is a drawing illustrating the relationship between the moving image on a display device of an embodiment of a display system according to the present invention and the movement of the window of the train over time.

In FIG. 10, the position of the windows of the passing vehicle, in this case the windows of a passing train carriage, are shown relative to the image being flash lit at various times, t.

At t=0, the frame 320 is shown spanning three digital display screens of the digital display device 300, such that the frame 320 coincides with the position of the window 330 of the carriage 340 of the passing train. The distance between the windows 330 of the carriage 340 is show as 'd' in FIG. 10. As can be seen, a frame 320 is also shown at a position on the digital display device 300, spanning several digital display screens, so as to coincide with the position of a further window 330' of the carriage 340.

The frames 320 are displayed by flashing multiple digital display screens across which the complete frame is shown.

At t=45 ms, the train has moved with respect to the digital display device 300, however, the frame 320 (the next frame in the sequence) now being displayed is positioned so as to coincide with the new position of the windows 330, 330' of the carriage 340.

Similarly, at t=90 ms and t=135 ms, the frames are displayed to coincide with the changed positions of the windows 330, 330' of the carriage 340.

Without the technical restrictions of limited frame rates due to width/separation distances of prior art display boards, the image size is determined by the train window size and distance from the digital display device. In the case of a train in a tunnel, this results in typical image sizes of around 1 metre high by 1.8 metres wide. Using prior art fixed display boards sizes, this would require a minimum train speed of over 140 kph in order to provide a moving picture display as perceived by the occupant of a passing train. However, by contrast, using the digital display technology of the present invention, each digital display screen stores several images and loads them for display as required.

To maintain a minimum of 22 frames per second equates to a flash separation of 45 ms. At a train speed of 10 m/s (36 kph), the flash separation would need to be around 450 mm. Since each frame is around 1.8 m wide, each digital display screen must flash 3 or 4 times as the train window passes. As the use of digital display screens allows the frame being displayed to be changed while the train is passing, the frames can effectively occupy overlapping positions on the digital display screens, thereby providing control over both the frame rate and the position of the frame within the digital display screen which would not otherwise be possible using prior art display systems.

Figure 11A:
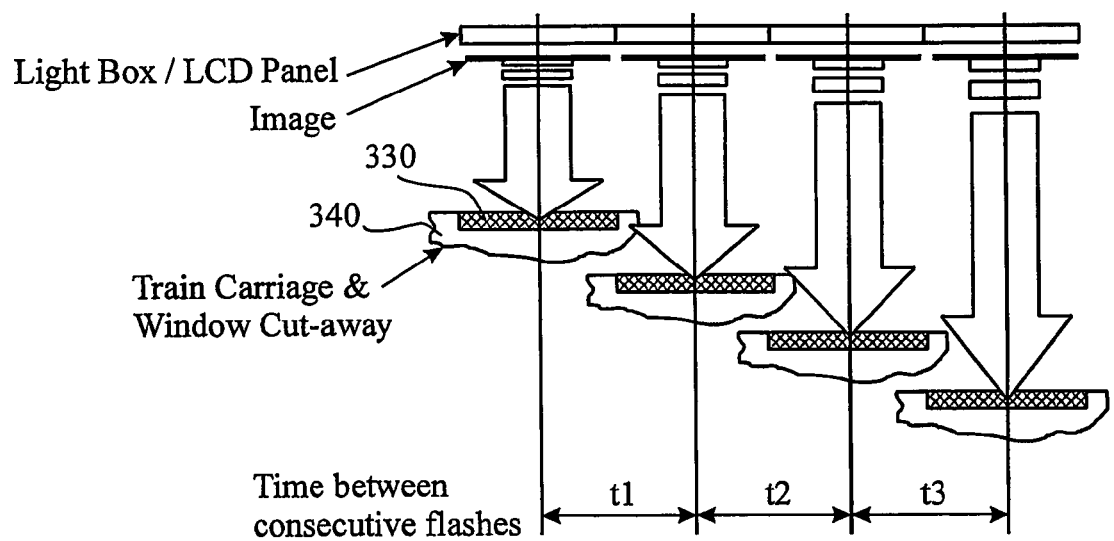
FIGS. 11A and 11B are drawings comparing the operation of a prior art display device with the operation of an embodiment of a display system according to the present invention.
Figure 11B:
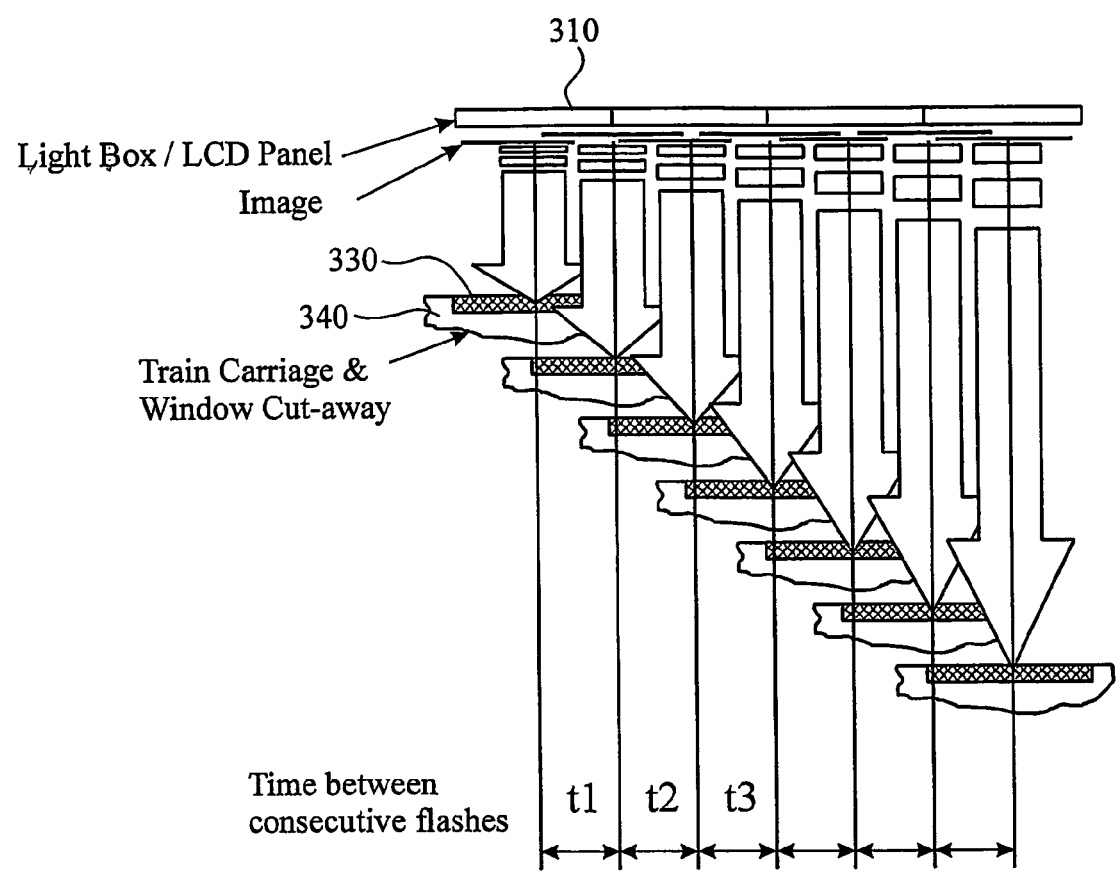

FIGS. 11A and 11B illustrate a comparison between a typical prior art image display system and a display system in accordance with the present invention.

In the prior art image display system illustrated in FIG. 11A, each frame of the image is displayed when the window 330 of the carriage 340 of the train passes a display board.

Only when the window 330 coincides with the next display board is the next frame in the sequence displayed. Thus, the train must maintain a suitable speed which allows at least 22 display boards to be passed each second in order for the sequence of frames to be perceived as a continuous and smooth moving picture by an occupant positioned at a window 330 of the carriage 340. t1, t2 and t3 indicate the time intervals between consecutive flashes to display each frame on the display boards, which is determined by the speed of the train and the width and separation of the display boards.

By contrast, FIG. 11B shows a train passing a digital display device of a display system according to the present invention. As each frame may span more than one digital display screen 310, the time intervals between flashes to display each consecutive frame are not limited by the movement of the window 330 to coincide with the next digital display screen as is the case in the prior art system of FIG. 11A, but instead, the time interval between consecutive flashes can be shorter so that, for example, if a train is passing the digital display screens at a slow speed, each frame is displaced a lesser distance than if the train were travelling at a higher speed, so as to display a perceived continuous smooth moving picture to an occupant of the passing train.

By adjusting the amount of displacement of consecutive frames in an image series, to correlate with the speed of the passing train, a continuous smooth moving picture may be perceived by an occupant from a window of the passing train. This is not possible using the prior art image display technology as the speed of the train must be fast enough that the train passes at least 22 display boards per second, the width of each board being sufficient to display a frame of such a size as to be readily observable by an occupant of the passing train. By contrast, the present invention still works effectively even if the train slows to stationary.

Figure 12A:
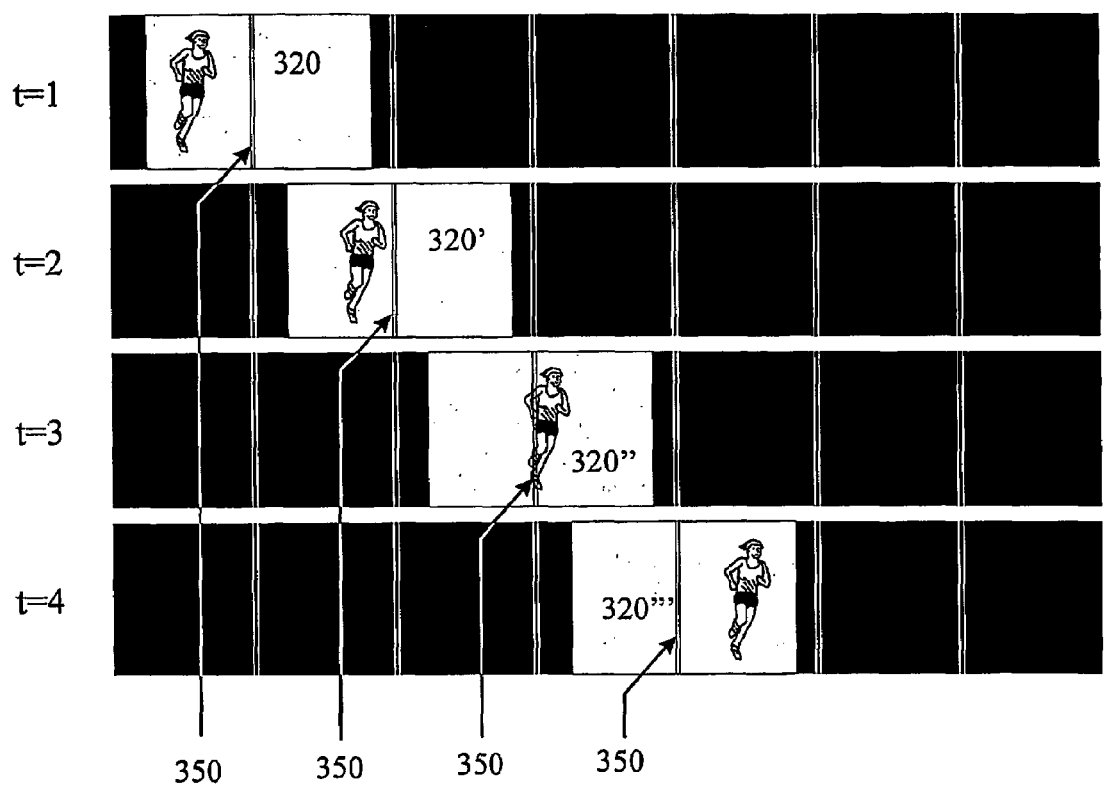
FIG. 12A is a diagrammatic representation of a series of frames making up a moving picture to illustrate the potential problem of blank sections in the display as perceived by a viewer.

FIG. 12A illustrates the potential problem that may occur at certain speeds of the passing vehicle, namely that a blank section 350, where the border between digital display screens occurs, becomes noticeable and distracting to a viewer when the blank section 350 repeatedly appears in the same place in sequential frames 320 of an image sequence.

Figure 12B:
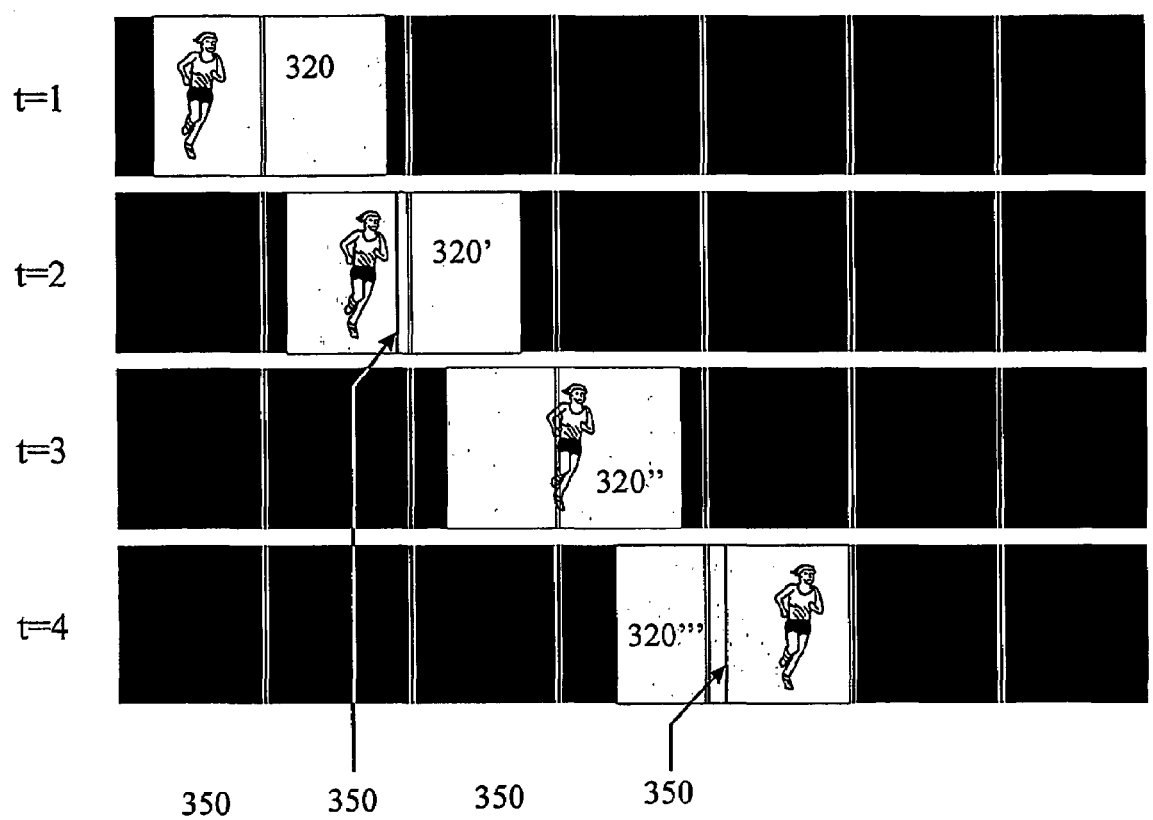
FIG. 12B illustrates the implementation of non-linear frame rate compensation to overcome the potential problem illustrated in FIG. 4.

In order to compensate for this perceived visual phenomenon, a non-linear frame rate may be implemented, as shown in FIG. 12B. Here, the time interval between consecutive frames 320 is no longer identical in length. In the example shown in FIG. 12B, the time interval between frames 320 and 320' has been shortened and the time interval between frames 320" and 320'" has been lengthened. This has the result that the position of the missing section is not repeatedly occurring in the same position in the series of frames making up the moving picture. Thus, the borders of the digital display screens remain unnoticeable to the viewer and distraction is avoided.

Figure 12C:
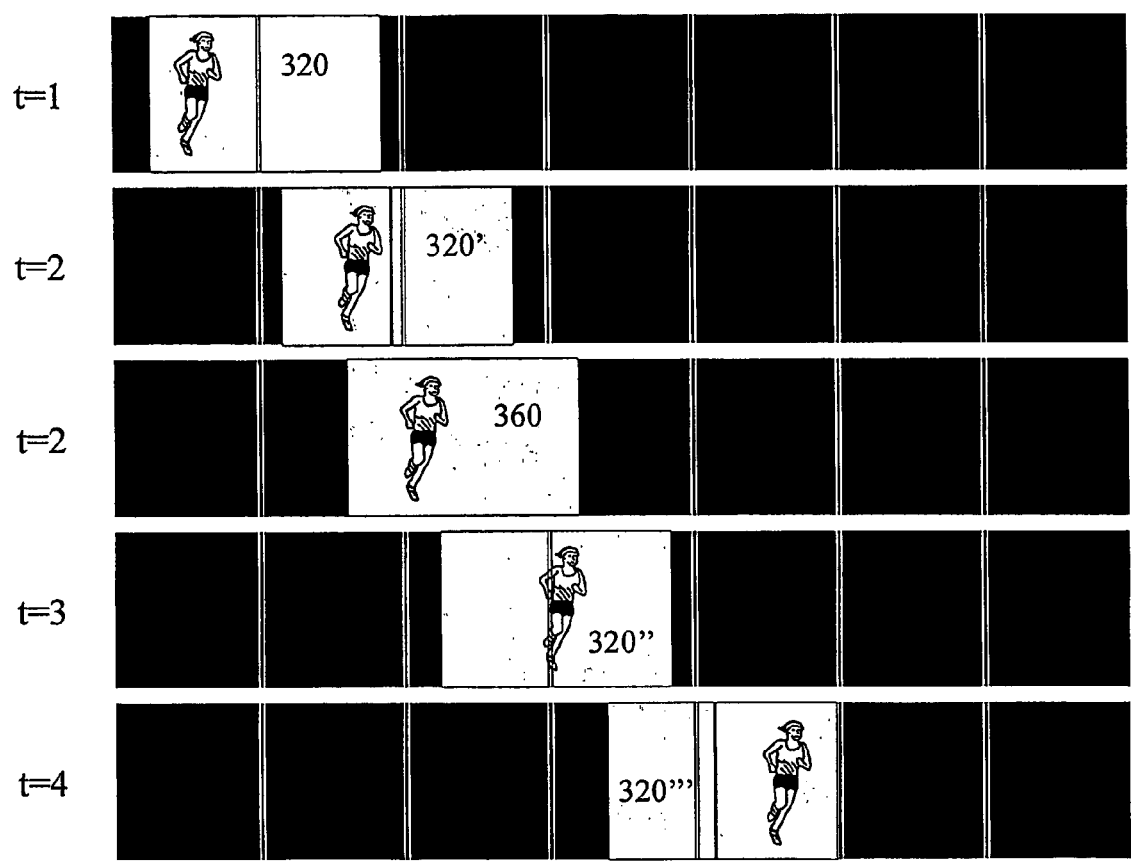
FIG. 12C illustrates the implementation of interpolated frame to compensate for the potential problem illustrated in FIG. 4.

Sometimes, implementation of a non-linear frame rate may result in flicker of the moving image due to the increased time interval between some frames and a brighter image due to a decreased time interval between some other frames. This may be compensated for by inserting a new frame between two adjacent frames which are separated by an increased time interval, as shown in FIG. 12C. Here, interpolated frame 360 is flashed at t=2½, interpolated frame 360 being identical to frame 320', but displaced on the digital display device 300 such that the border between screens falls at a different position on the frame 360 to that of frame 320'. The interpolated image of frame 360 is of a lower light intensity to frame 320'.

Figure 12D:
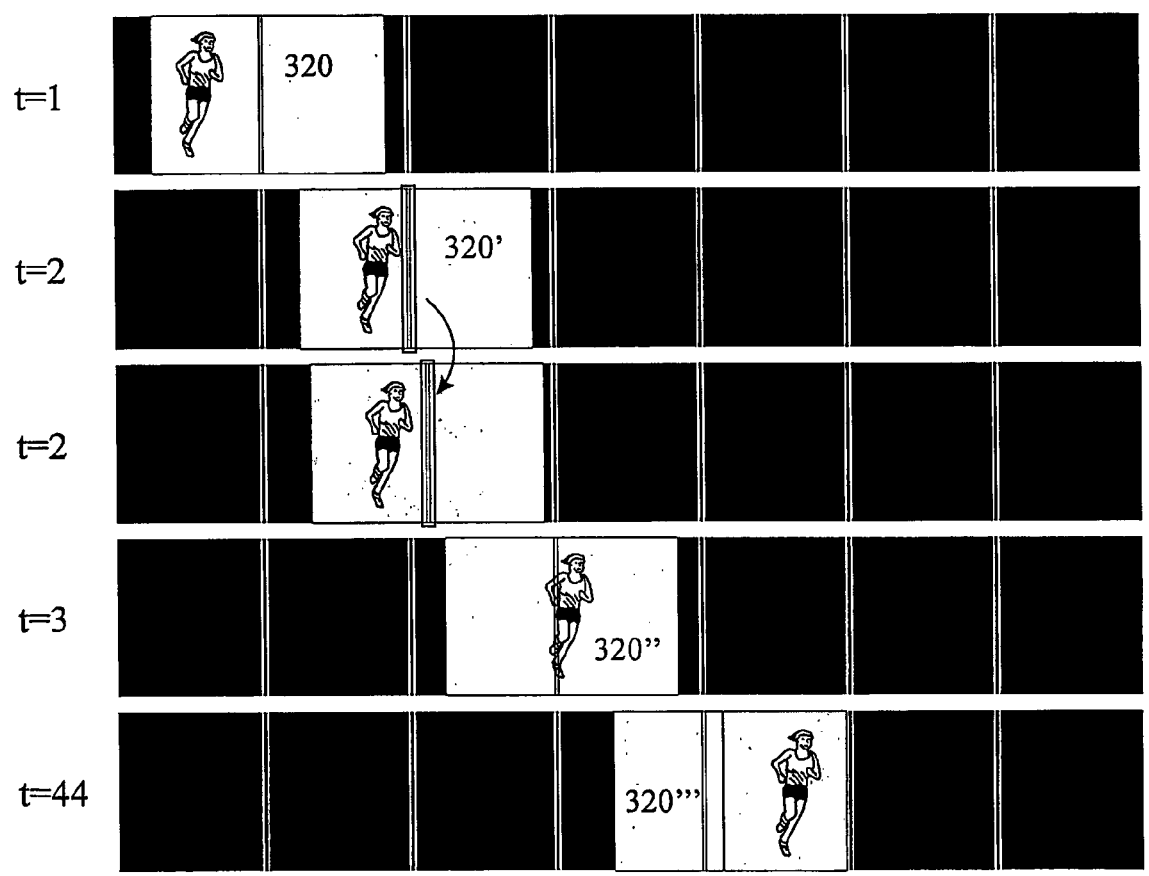
FIG. 12D is a diagram showing the image intensity adjustment of the interpolated frame shown in FIG. 4B.

An alternative approach to non-linearising the frame rate is illustrated in FIG. 12D, which involves inserting a frame that is of a lower intensity to frame 320', except for a bright line on the frame 360 corresponding to the position at which the border interrupted the frame 320'.

These two techniques may applied separately, or in combination.

Figure 12E:
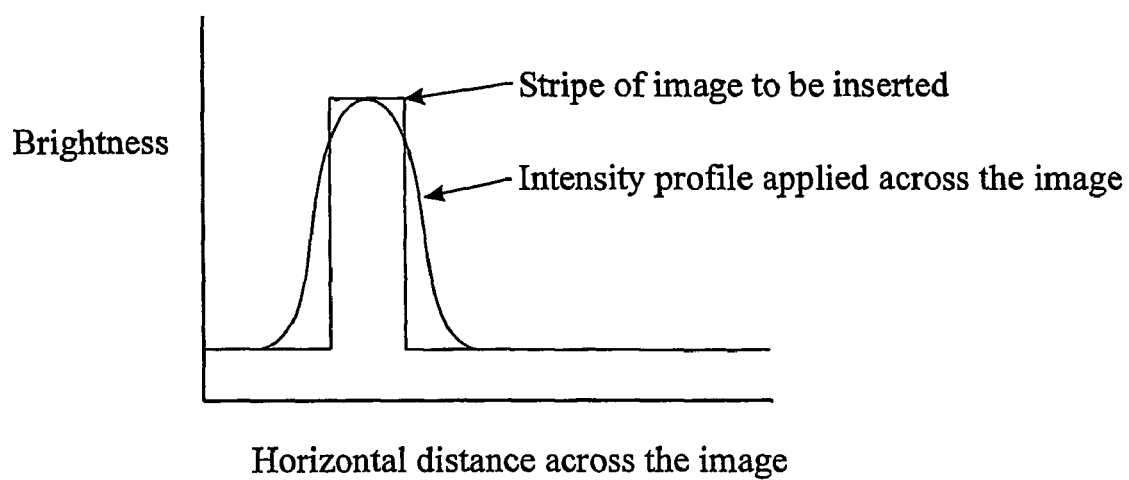
FIG. 12E is a graph of the brightness of the horizontal distance across the image.

FIG. 12E shows the light intensity of the frame 360, from which it can be seen that the bright line is of high intensity relative to the rest of the frame 360. However, the best results are achieved by applying an intensity profile in which a light intensity gradient exists between the bright line and the remainder of the frame is as shown in FIG. 12D, rather than there being a huge instant drop in light intensity between the edge of the bright line and the remainder of the frame 360. In this way, the perception of the border of the digital display screen to a view is minimised or avoided altogether.

Although aspects of the invention have been described with reference to the embodiments shown in the accompanying drawings, it is to be understood that the invention is not limited to those precise embodiments and that various changes and modifications may be effected without further inventive skill and effort For example, the digital display screen may be a single continuous screen on which each consecutive frame is appropriately displaced relative to the preceding frame. Such a case would provide the advantage that there would be no need to compensate for a blank section between neighbouring screens.

The invention claimed is:

1. A display system comprising a digital display device operable to display an image, a speed detector operable to produce a speed signal indicative of the speed of a vehicle having a window passing the display device, a vehicle detector operable to produce a position signal indicative of the position of the vehicle relative to the display device, and processing means connected to receive a signal from the speed detector indicative of the speed of the vehicle and a signal from the vehicle detector indicative of the position of the vehicle window relative to the display device, and operable to display sequential overlapping images on the display device displayed in synchronism with the speed of the vehicle as the vehicle passes the display device such that the location of the vehicle window and the location of the image on the display device coincide.

2. A display system according to claim 1 wherein the image comprises a series of frames making up a film sequence wherein the display device is operable to display the next frame in the series at a position on the display device relative to the position at which the previous frame was displayed determined by the speed of the vehicle as the vehicle passes the display device such that as each frame is displayed in sequence, the location of each frame on the display device coincides with the position of the vehicle window as the vehicle passes the display device.

3. A display system according to claim 1 wherein the vehicle comprises a plurality of windows such that an image is displayed on the digital display device to coincide with the position of each window of the vehicle.

4. A display system according to claim 1 wherein the display device comprises a single digital display screen.

5. A display system according to claim 1 wherein the display device comprises a plurality of digital display screens.

6. A display system according to claim 5 wherein the screens are arranged substantially adjacent one another.

7. A display system according to claim 6 wherein the screens are arranged such that the adjacent edges of neighbouring screens abut one another.

8. A display system according to claim 5 wherein an image is displayed on the display device such that a single flame spans across more than one display screen.

9. A display system according to claim 1 wherein the digital display screen comprises an LCD screen or a TFT screen.

10. A method of displaying an image comprising the steps of
providing a digital display device operable to display an image thereon;
providing a speed detector operable to produce a speed signal indicative of the speed of a vehicle passing the display device;
providing a vehicle detector operable to produce a position signal indicative of the position of the vehicle relative to the display device;
providing processing means in connection with the speed detector and the vehicle detector and operable to receive a signal indicative of the speed of the vehicle and a signal indicative of the position of the vehicle; and
generating an output signal to display sequential overlapping images on the digital display device displayed in synchronism with the speed of the vehicle as the vehicle passes the display device such that the position of the vehicle window and the location of the image on the digital display device coincide, the image being displayed by means of a back illumination flash.

11. A method according to claim 10 wherein the image comprises a series of frames making up a film sequence wherein the position at which the next frame in the series is displayed on the display device relative to the position at which the previous frame was displayed is determined by the speed of the vehicle as the vehicle passes the display device such that as each frame is displayed in sequence, the location of each frame on the display device coincides with the position of the vehicle window as the vehicle passes the display device.

12. A method according to claim 10 wherein the display device comprises a single display screen.

13. A method according to claim 10 wherein the display device comprises a plurality of digital screens.

14. A method according to claim 13 wherein the screens are arranged substantially adjacent one another.

15. A method according to claim 14 wherein the screens are arranged such that the adjacent edges of neighbouring screens abut one another.

* * * * *